July 20, 1926.

H. A. NELSON

RECORDING SPEEDOMETER

Filed Dec. 12, 1924

1,593,505

3 Sheets-Sheet 1

H. A. Nelson,
INVENTOR

BY Victor J. Evans,
ATTORNEY

WITNESS:

July 20, 1926.

H. A. NELSON

RECORDING SPEEDOMETER

Filed Dec. 12, 1924

1,593,505

3 Sheets-Sheet 2

H. A. Nelson,
INVENTOR
BY Victor J. Evans,
ATTORNEY

WITNESS:

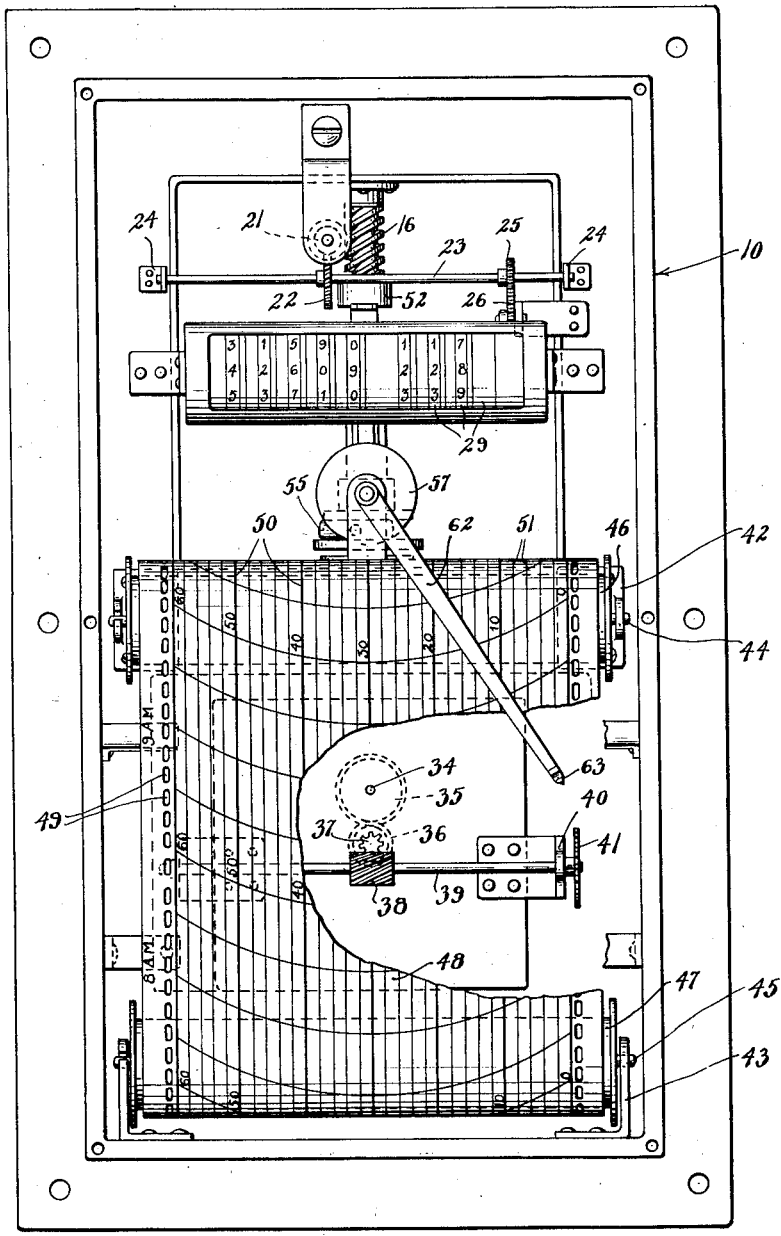

Patented July 20, 1926.

1,593,505

UNITED STATES PATENT OFFICE.

HARRY AVERT NELSON, OF CLARKDALE, ARIZONA.

RECORDING SPEEDOMETER.

Application filed December 12, 1924. Serial No. 755,508.

This invention relates to speed responsive mechanism and has for its object the provision of a novel device adapted for use upon a motor vehicle or the like whereby to make a permanent record of the speed at which the car has been traveling at any time, such record being of great value as evident in case the driver is arrested and charged with speeding or parking too long.

An important and more specific object is the provision of a device of this character which embodies a speedometer or speed responsive mechanism in association with a clockwork mechanism driving a record sheet over which moves a stylus governed by the speedometer mechanism, the stylus acting to make a permanent record upon the sheet or strip, which record could be produced at any required time to prove or disprove, as the case may be, a charge of speeding or excessive parking.

The invention further contemplates the provision of various details in the construction and arrangement of parts whereby the device will be simple and inexpensive in manufacture, positive in action, efficient and durable in service, and a general improvement in the art.

With the above and other objects and advantages in view, the invention consists in the details of construction to be hereinafter more fully described and claimed, and illustrated in the accompanying drawings, in which:—

Figure 1:
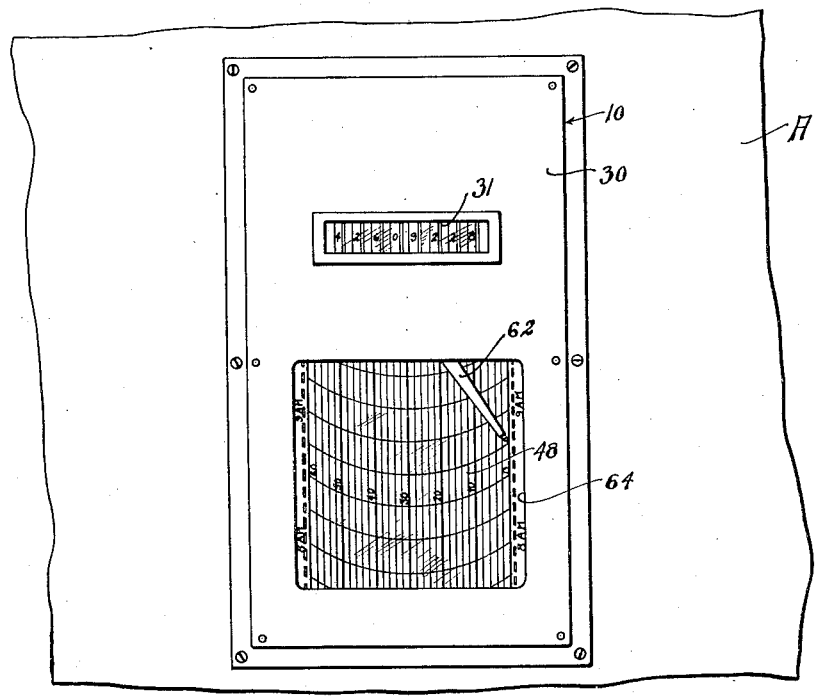
Figure 4:
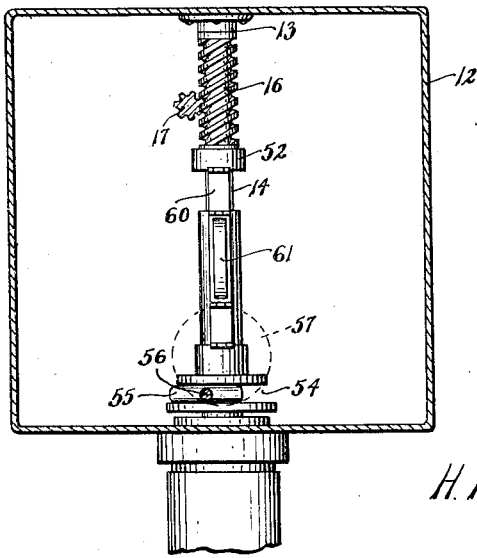
Figure 2:
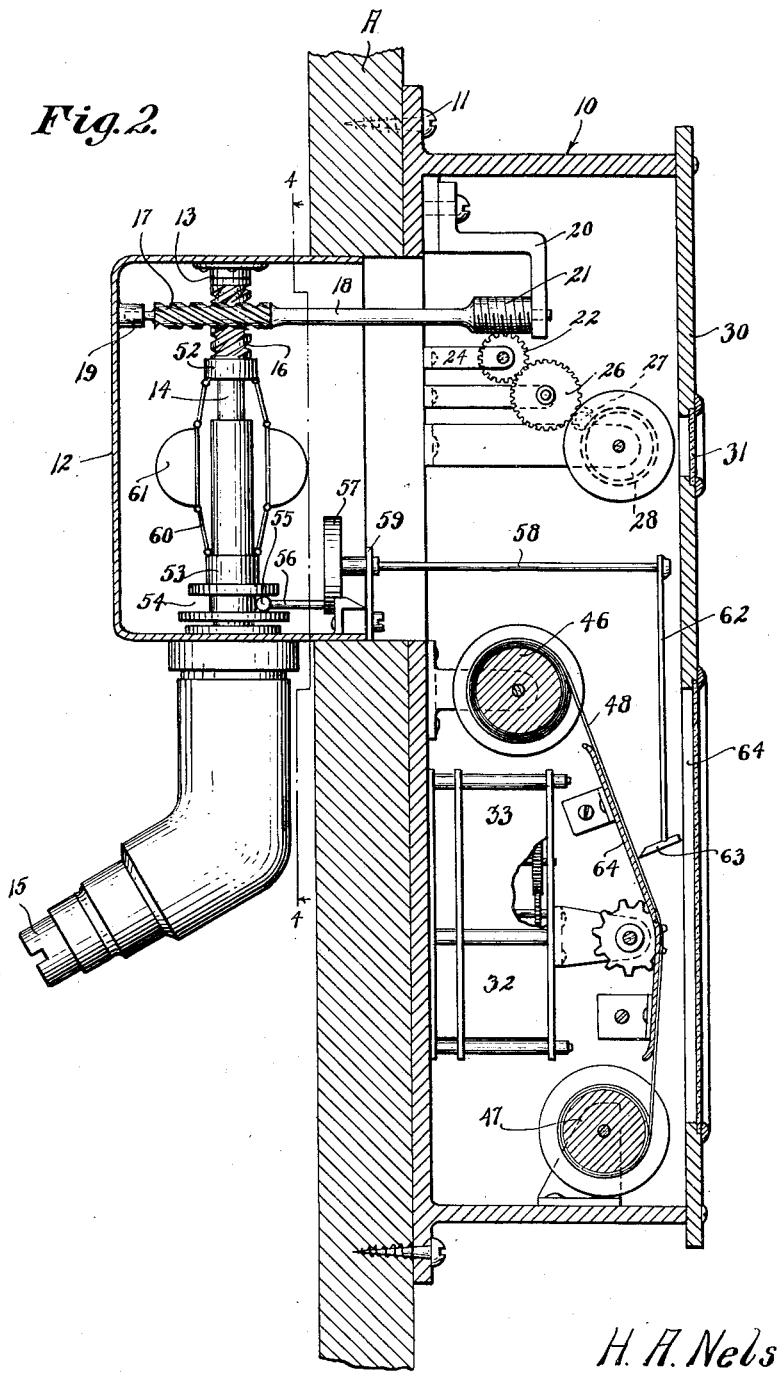

Figure 1 is an elevation of the complete device showing it mounted upon a suitable support, Figure 2 is a vertical longitudinal section, Figure 3 is a front elevation with the cover removed so as to disclose the mechanism, and Figure 4 is a section on the line 4—4 of Figure 2.

Referring more particularly to the drawings, the numeral 10 designates a casing of any desired size, shape and material, provided with suitable means indicated at 11 whereby it may be secured upon the dash of instrument board A of a vehicle or upon any other suitable support. Carried by or otherwise associated with the casing 10 is a housing 12 equipped with suitable bearings 13 within which is journaled a shaft 14 which necessarily includes a flexible portion and which terminates in a coupling member 15 adapted to be connected by the usual drive chain structure with whatever mechanism is ordinarily provided upon a vehicle for operating the speedometer. The shaft 14 carries a spiral gear 16 meshing with a spiral gear 17 on a horizontally disposed shaft 18 which has one end journaled in a bearing 19 at the back of the housing 12 and which has its other end journaled within a bearing bracket 20 in the casing 10. Near the bracket 20, the shaft 18 carries a screw gear 21 which meshes with a worm wheel 22 on a horizontal shaft 23 arranged at right angles to the shaft 18 and journaled in suitable bearings 24. The shaft 23 carries a spur gear 25 meshing with a spur gear 26 which in turn drives a pinion 27 meshing with a gear 28 operatively connected with the inmost one of a series of discs 29 which bear numerals ranging from 0 to 9 in the usual manner and which are connected as is customary in speedometer constructions so that the readings on the discs will give the mileage traveled by the vehicle. The casing 10 is closed by a cover 30 having a glass covered sight opening 31 through which reading of the indicia on the discs or dials may be made. There is nothing distinctive about this above described mechanism though an explanation is given for the sake of clearness. Suitably mounted within the casing 10 is a conventional clockwork mechanism 32 preferably enclosed within a casing 33 and embodying a shaft 34 carrying a gear 35 meshing with a gear 36 which carries a spiral gear 37, meshing with a spiral gear 38 on a shaft 39 mounted for rotation within suitable bearings 40. The shaft 39 is equipped at its ends with sprockets 41 for a purpose to be described.

Mounted at the intermediate and lower portions of the casing 10 are slotted brackets 42 and 43, respectively, within which are removably engaged spindles 44 and 45 carrying spools 46 and 47, respectively, carrying a paper or other flexible strip 48. Initially, the paper is all wound onto one spool, for example the spool 46 and the strip is adapted to be unwound therefrom and wound onto the other spool 47. For this reason, the marginal edges of the strip are formed with holes 49 coacting with the teeth of the sprockets 41 so that when the shaft 39 is rotated by the clockwork the strip will be correspondingly driven. Obviously, the spools are removable so that when a strip has traveled its full force and been unwound from the spool 46 onto the spool 47 the filled or old strip and the spool may be removed and a new strip placed in position. The slotting of the brackets 42 and 43 permits this action.

The strip 48 may be inscribed with longitudinally extending lines 50 spaced apart as shown and representing, for example, ten miles each in a matter of speed. The spaces between the lines 50 may be further subdivided by other lines 51, though this is a detail more or less immaterial. At certain intervals, it is preferable that the strip be inscribed with numerals adjacent the lines 50 so as to facilitate the reading of the record made by the mechanism to be described. Near its edges it is preferable to have the strip or sheet inscribed with legends indicating the hour of the day.

Fixed upon the shaft 14 is a collar 52 and splined upon the shaft is a collar 53 formed with a groove 54 within which engages an arm 55 on a rod 56 projecting from the base of a disc 57 mounted upon a shaft 58 journaled within a suitable bearing 59. Connecting the collars 52 and 53 are spring strips 60 carrying fly-weights 61 which will naturally move outwardly under the influence of centrifugal force when the shaft 14 is rotated. The outward movement of the fly-weights 61 will govern the position of the collar 53 and as the arm 55 is engaged within the groove 54 it is obvious that as the collar 53 moves longitudinally with respect to the shaft 14, the disc 57 and consequently the shaft 58 will be rocked correspondingly. Carried by the free end of the shaft 58 is an arm 62 carrying a suitable stylus 63 bearing against the paper strip 48. It is preferable to provide a plate like table beneath the paper strip at the point or points adapted to be engaged by the stylus 63 in order to prevent the stylus from punching through or cutting the paper. It should be stated that the lower portion of the cover plate 30 is provided with a glass covered sight opening 64 so that the action of the stylus and the record made thereby may be visible.

In the operation of the device, it will be apparent that the paper strip 48 is moved continually by the clock mechanism. If the car is left standing as for example when parked, the movement of the paper strip beneath the stylus 63, which latter is of course stationary, will inscribe a mark longitudinally upon the paper strip the length of the mark corresponding exactly to the length of time the car has been standing still. When the vehicle is traveling, it is obvious that the speed will govern the position of the flyweight 61 and as the groove collar 54 associated with the flyweight engages the arm 55 on the rod 56 projecting from the disc 57, it is obvious that the shaft 58 carrying the arm 62 and stylus will be rocked in accordance with the speed. When the speed is comparatively low, the arm 62 will be toward the right hand limit of its movement whereas when the speed rises the arm will swing toward the left. Owing to the fact that the arm is thus moved and further on account of the fact that the paper strip is constantly moving it is obvious that the stylus 63 will inscribe upon the paper strip a line which, upon inspection, will disclose the exact speed at which the vehicle was traveling at any given time. This paper strip bearing the record thereon will be of great value as evidence in case a driver is charged with speeding or with parking too long at a certain place and on the other hand the record will be of equal value to the police or other authorities as evidence proving the speed at which a car has been traveling or the time it has remained parked. Improper and fraudulent prosecution will thus be prevented and at the same time reckless and careless drivers may be easily detected and punished. If some regulations were to be put into effect requiring that all cars be equipped with a device of this nature and that the record be submitted at periodic intervals for inspection, it is obvious that improper handling of cars and excessive speeding would be stamped out in a short time in view of the fact that it would become practically impossible to escape punishment.

While I have shown and described the preferred embodiment of the invention, it should of course be understood that I reserve the right to make such changes in the form, construction and arrangement of parts as will not depart from the spirit of the invention or the scope of the subjoined claim.

Having thus described the invention, I claim:—

In combination with a speed responsive mechanism including fly balls and a grooved collar carried thereby and movable longitudinally by movement of the fly balls under the influence of centrifugal force during rotation thereof, a marking mechanism comprising a supporting bracket, a rock shaft journally mounted through said bracket, an arm on one end of said shaft carrying a stylus, a disk on the other end of the shaft, and an arm carried by the disk eccentrically thereof and terminating in a lateral portion engaging within said grooved collar.

In testimony whereof I affix my signature.

HARRY AVERT NELSON.